(12) United States Patent
Biro

(10) Patent No.: US 8,473,492 B1
(45) Date of Patent: Jun. 25, 2013

(54) ADVERTISING IN DESKTOP SEARCHES

(75) Inventor: Ross Biro, Ashburn, VA (US)

(73) Assignee: Google Inc., Mountain View, CA (US)

( * ) Notice: Subject to any disclaimer, the term of this patent is extended or adjusted under 35 U.S.C. 154(b) by 904 days.

(21) Appl. No.: 11/750,170

(22) Filed: May 17, 2007

(51) Int. Cl.
*G06F 7/00* (2006.01)
*G06F 17/30* (2006.01)

(52) U.S. Cl.
USPC .......... 707/736; 707/758; 705/14.49

(58) Field of Classification Search
USPC . 707/3, 5, 104.1, 200, 205, 736, 758; 705/14, 705/14.53, 14.54, 14.66, 14.4, 14.49
See application file for complete search history.

(56) References Cited

U.S. PATENT DOCUMENTS

| | | | | |
|---|---|---|---|---|
| 5,961,591 A * | 10/1999 | Jones et al. | | 709/217 |
| 6,049,671 A * | 4/2000 | Slivka et al. | | 717/173 |
| 6,182,050 B1 * | 1/2001 | Ballard | | 705/14 |
| 6,317,789 B1 * | 11/2001 | Rakavy et al. | | 709/224 |
| 6,643,657 B1 * | 11/2003 | Baird et al. | | 707/100 |
| 6,665,710 B1 * | 12/2003 | Bates et al. | | 709/217 |
| 6,678,866 B1 * | 1/2004 | Sugimoto et al. | | 715/203 |
| 7,529,739 B2 * | 5/2009 | Raub et al. | | 707/3 |
| 2003/0093315 A1 * | 5/2003 | Sato | | 705/14 |
| 2004/0059632 A1 * | 3/2004 | Kang et al. | | 705/14 |
| 2004/0083474 A1 * | 4/2004 | McKinlay et al. | | 717/176 |
| 2005/0071239 A1 * | 3/2005 | Tormey et al. | | 705/26 |
| 2005/0097179 A1 * | 5/2005 | Orme | | 709/207 |
| 2005/0097440 A1 * | 5/2005 | Lusk et al. | | 715/500.1 |
| 2005/0132305 A1 * | 6/2005 | Guichard et al. | | 715/855 |
| 2006/0053048 A1 * | 3/2006 | Tandetnik | | 705/14 |
| 2006/0061806 A1 * | 3/2006 | King et al. | | 358/1.15 |
| 2006/0224602 A1 * | 10/2006 | Rawat et al. | | 707/100 |
| 2008/0086773 A1 * | 4/2008 | Tuvell et al. | | 726/23 |
| 2008/0168048 A1 * | 7/2008 | Bell et al. | | 707/5 |
| 2008/0209060 A1 * | 8/2008 | Toumi et al. | | 709/231 |

OTHER PUBLICATIONS

Mysticgeek, "The How-To Geek: Display Hidden Folders in XP", Posted Thursday, Apr. 26, 2007, web archive, http://web.archive.org/web/20070510010019/http://www.howtogeek.com/howto/windows/display-hidden-folders-in-xp/, Archived May 10, 2007, 4 pp.*

* cited by examiner

*Primary Examiner* — Marc Somers
(74) *Attorney, Agent, or Firm* — Fish & Richardson P.C.

(57) ABSTRACT

A computer-implemented method is described. The method includes receiving permission from a user to store information on a storage device operatively coupled to a computer system associated with the user, generating a file comprising content designed to cause at least a portion of the file to be displayed in search results when a search of the storage device is performed, and storing the generated file on the storage device in a manner that is invisible to a user of the computer system. Alternatively, the generated file can be stored without a user's permission.

90 Claims, 6 Drawing Sheets

Search Results 210

| Key Column 405 | File Name Column 410 | Directory Column 415 | Metadata Column 420 | Content Column 425 |
|---|---|---|---|---|
| Key 1 | File name 1 | Directory 1 | Metadata 1 | Content 1 |
| Key 2 | Ad File | Directory 2 | Metadata 2 | Content 2 |
| Key 3 | File name 3 | Directory 3 | Metadata 3 | Content 3 |
| Key 4 | File name 4 | Directory 4 | Metadata 4 | Content 4 |
| Key 5 | File name 5 | Directory 5 | Metadata 5 | Content 5 |

FIG. 4

ADVERTISING IN DESKTOP SEARCHES

TECHNICAL FIELD

The following description relates to presenting content in response to an electronic search.

BACKGROUND

Searching for content stored on a stand-alone computer, e.g., a desktop computer, can be performed using any of several different tools. Desktop search engines can build and maintain an index database of content. In response to search queries received from a user, the desktop search engine can compare the search query with the contents of the index database and retrieve files containing content that match the search query.

A user searching for content on the internet or other network can interact with servers hosting web sites to perform such searches. In internet searching, a user's search query can be compared against an index database of content on the internet, the content including web pages on several websites. In this manner, a user can be presented with one or more web pages containing content relevant to the user's search query. In addition to search results, the user can be presented with advertisements related to the search query. Advertisers and publishers of web pages can collaborate with the search engine administrators to identify the search query and present, to the user, advertisements relevant to the search query in addition to relevant publishers' web pages.

SUMMARY

In general, this document describes enabling content (e.g., advertisements) to be presented to a user in response to search for content on a stand-alone computer system. In one example, an advertisement file containing one or more content items (e.g., advertisements) can be placed on the stand-alone computer with or without a user's permission. The advertisement file can be configured to include information such as key words and the content items. The advertisement file can further be configured to be included in an index database of content on a storage device with or without the user's consent. When a user performs a local search for content on the computer using one or more searching facilities available on the computer, the advertisement file, or portions thereof, can be included among the search results. The content items in the advertisement file can be displayed as one or more of the search results.

In one aspect, a computer-implemented method includes receiving permission from a user to store information including files on a storage device operatively coupled to a computer system associated with the user, generating a file comprising content designed to cause at least a portion of the file to be displayed in search results when a search of the storage device is performed, and storing the generated file on the storage device in a manner that is invisible to the user of the computer system.

This, and other aspects, can include one or more of the following features. The content can include one or more advertisements. The content can include one or more advertisements and text including key words selected by a creator of the file to cause the one or more advertisements to appear at or near a top of a search results list when a search of the storage devices is performed. The invisible manner can include placing the file in a hidden folder on the storage device. The invisible manner can further include delaying placing the file on the storage device for a substantial period of time following receipt of the user's permission. The generating and storing can occur on an ongoing basis over time. The generating and storing can occur on a periodic basis over time. The generating and storing can be repeated one or more times. Generating the file and receiving permission can be order independent. The permission can be received in response to a request. The permission can be sought from the user. The storing can be pursuant to receiving in the permission. The storing can be prior to receiving the permission. The file can be removed if the permission is denied. The storing can be during receiving the permission. The storing can be aborted if permission is denied. The method can include including the stored file in an index database of content of the storage device. The generated file can be received as an attachment to an electronic mail. The generated file can be included among installation files for an application to be installed on the computer.

In another aspect, a system includes a file generator configured to receive permission from a user to store information including files on a storage device operatively coupled to a computer system associated with the user, generate a file comprising content designed to cause at least a portion of the file to be displayed in search results when a search of the storage device is performed, and store the generated file on the storage device in a manner that is invisible to the user of the computer system.

This, and other aspects, can include one or more of the following features. The generator can further be configured to include one or more advertisements in the content of the file. The generator can further be configured to include in the generated file, one or more advertisements and text including keywords selected by a creator of the file and instructions to cause the one or more advertisements to appear at or near a top of a search results list when a search of the storage device is performed. The generator can further be configured to include in the generated file, instructions to enable placing the file in a hidden folder on the storage device. The generator can further be configured to delay placing the file on the storage device for a substantial period of time following receipt of the user's permission. The generator can further be configured to generate and store the file on an ongoing basis over time. The generator can further be configured to generate and store the file on a periodic basis over time. The generator can further be configured to generate and store the file repeatedly one or more times. The generator can further be configured to generate the file and receive permission to store information on the storage device independent of an order. The generator can further be configured to receive the permission in response to a request. The generator can further be configured to seek permission from the user. The generator can further be configured to store the file pursuant to receiving the permission. The generator can further be configured to store the file prior to receiving the permission. The generator can further be configured to remove the file if the permission is denied. The generator can further be configured to store the file during receiving the permission. The generator can further be configured to abort the storing if permission is denied. The generator can further be configured to encode the stored file with the instructions to enable including the stored file in an index database of content of the storage device. The generator can further be configured to attach to the generated file to an electronic mail. The generator can further be configured to attach the generated file among installation files for an application to be installed on the computer.

In another aspect, a system includes means for receiving permission from a user to store information including files on a storage device operatively coupled to a computer system associated with the user, means for generating a file comprising content designed to cause at least a portion of the file to be displayed in search results when a search of the storage device is performed, and means for storing the generated file on the storage device in a manner that is invisible to the user of the computer system.

This, and other aspects, can include one or more of the following features. The content can include one or more advertisements. The content can include one or more advertisements and text including keywords selected by a creator of the file to cause the one or more advertisements to appear at or near a top of a search results list when a search of the storage device is performed. The invisible manner can include placing the file in a hidden folder on the storage device. The means for storing the generated file on the storage device in the invisible manner can further include means for delaying placing the file on the storage device for a substantial period of time following receipt of the user's permission. The generating and storing can occur on an ongoing basis over time. The generating and storing can occur on a periodic basis over time. The generating and storing can be repeated one or more times. Generating the file and receiving permission can be order independent. The permission can be received in response to a request. The permission can be sought from the user. The storing can be pursuant to receiving the permission. The storing can be prior to receiving the permission. The file can be removed if the permission is denied. The storing can be during receiving the permission. The storing can be aborted if permission is denied. The system can further include means for configuring be stored file to be included in an index database of content of the storage device. The generated file can be received as an attachment to an electronic mail. The generated file can be included among installation files for an application to be installed on the computer.

In another aspect, a computer-implemented method includes generating a file comprising content designed to cause at least a portion of the file to be displayed in search results when a search of a storage device including the generated file is performed, and storing the generated file on a storage device operatively coupled to a computer system associated with a user in a manner that is invisible to a user of the computer system.

This, and other aspects, can include one or more of the following features. The generated file can be stored without receiving permission from a user of the computer. The generated file can be stored despite the user's refusal to grant a permission to store the generated file. The content can include one or more advertisements. The content can include one or more advertisements and text including keywords selected by a creator of the file to cause the one or more advertisements to appear at or near the top of a search results list when a search of the computer system's storage device is performed. The invisible manner can include placing the file in a hidden folder on the storage device. The generating and storing can occur on an ongoing basis over time. The generating and storing can occur on a periodic basis over time. The generating and storing can be repeated one or more times. The method can further include including the stored file in an index database of content of the storage device. The generated file can be received as an attachment to an electronic mail. The generated file can be included among installation files for application to be installed on the computer.

In another aspect, a system comprising a file generator is configured to generate a file comprising content designed to cause at least a portion of the file to be displayed in search results when a search of a storage device including the generated file is performed, and store the generated file on a storage device operatively coupled to a computer system associated with a user in a manner that is invisible to a user of the computer system.

This, and other aspects, can include one or more of the following features. The generator can further be configured to store the generated file without receiving permission from a user of the computer system. The generator can further be configured to store the generated file despite the user's refusal to grant permission to store the generated file. The generator can further be configured to include one or more advertisements in the content of the file. The generator can further be configured to include in the generated file one or more advertisements and text including key words selected by a creator of the file and instructions to cause the one or more advertisements to appear at or near the top of a search results list when a search of the storage device is performed. The generator can further be configured to include in the generated file, instructions to enable placing the file in a hidden folder on the storage device. The generator can further be configured to generate and store the file on an ongoing basis over time. The generator can further be configured to generate and store the file on a periodic basis over time. The generator can further be configured to generate and store the file repeatedly one or more times. The generator can further be configured to include the stored file but instructions to enable including the stored file in an index database of content of the storage device. The generator can further be configured to attach the generated file to an electronic mail. The generator can further be configured to attach the generated file among installation files for an application to be installed on the computer.

In another aspect, a system includes means for generating a file comprising content designed to cause at least a portion of the file to be displayed in search results when a search of a storage device including the generated file is performed, and means for storing the generated file on a storage device operatively coupled to a computer system associated with a user in a manner that is invisible to a user of the computer system.

This, and other aspects, can include one or more of the following features. The means for storing the generated file can include means for storing the generated file without receiving permission from a user of the computer system. The means for storing the generated file can include means for storing the generated file despite the user's refusal to grant a permission to store the generated file. The means for generating the file can include means for including one or more advertisements in the file. The means for generating the file can include means for including in the file, content comprising one or more advertisements and text including key words selected by a creator of the file and instructions to cause the one or more advertisements to appear at or near a top of a search results list when a search of the computer system's storage device is performed. The means for storing the file in an invisible manner can include means for placing the file in a hidden folder on the storage device. The generating and storing can occur on an ongoing basis over time. The generating and storing can occur on a periodic basis over time. The generating and storing can be repeated one or more times. The system can further include means for including the stored file in an index database of content of the storage device. The generated file can be received as an attachment to an electronic mail. The generated file can be included among installation files for an application to be installed on the computer.

In another aspect, a method includes generating a file including one or more advertisements, the generated file designed to cause at least one advertisement to be displayed in search results when a search of a storage device including the generated file is performed, and transmitting the generated file to a user's computer for storage on a storage device operatively coupled to a computer system associated with the user.

In another aspect, a system includes a file generator configured to generate a file including one or more advertisements, the generated file designed to cause at least one advertisement to be displayed in search results when a search of a storage device including the generated file is performed, and transmit the generated file to a user's computer for storage on a storage device operatively coupled to a computer system associated with the user.

In another aspect, a system includes means for generating a file including one or more advertisements, the generated file designed to cause at least one advertisement to be displayed in search results when a search of a storage device including the generated file is performed, and means for transmitting the generated file to a user's computer for storage on a storage device operatively coupled to a computer system associated with the user.

The system and techniques described here may present one or more of the following advantages. Advertisers who normally present advertisements to internet users can target users that are working with stand alone-computer systems and/or computer systems in a cluster or local area network (LAN) that do not have communicability with the internet or other wide area network (WAN). Because the advertisement is transferred to a user's stand-alone computer, the advertisement can be presented to the user even if the user is not connected to the internet. In addition, the advertiser need not be concerned with storing the advertisement at a location maintained by the advertiser since the advertisement is stored on the user's system. Further, a user presented with advertisements in response to a desktop search can subsequently access the products and/or services in the advertisements. Additionally, when the advertisement file is stored on the server of a LAN, users at the nodes of the LAN can be presented with advertisements for products and/or services of interest, even if the server is not connected to the internet.

A company can pursue patent rights for a number of purposes, such as attempting to ensure that others do not use the claimed subject matter to create a negative experience for users, and when a company pursues patent rights it does not necessarily mean that the company is practicing, or intends to practice, the claimed subject matter. In that regard, the present inventor recognizes that the disclosed systems and techniques potentially could be used not only for purposes that benefit consumers and the public at large but potentially also for malicious uses such as surreptitiously controlling the download and display of uninvited advertisements or other content on a user's computer. Both the inventor and the company to which this patent application is assigned are committed to practicing only the beneficial uses of the disclosed systems and techniques, if at all. In addition, it is contemplated that any patent claims that issue may be enforced against bad actors to prevent the disclosed system and techniques being used for malicious purposes.

The details of one or more implementations are set forth in the accompanying drawings and the description below. Other features and advantages will be apparent from the description and drawings, and from the claims.

DESCRIPTION OF DRAWINGS

FIG. 4 is an example of an index database.

Like reference symbols in the various drawings indicate like elements.

DETAILED DESCRIPTION

Figure 1:
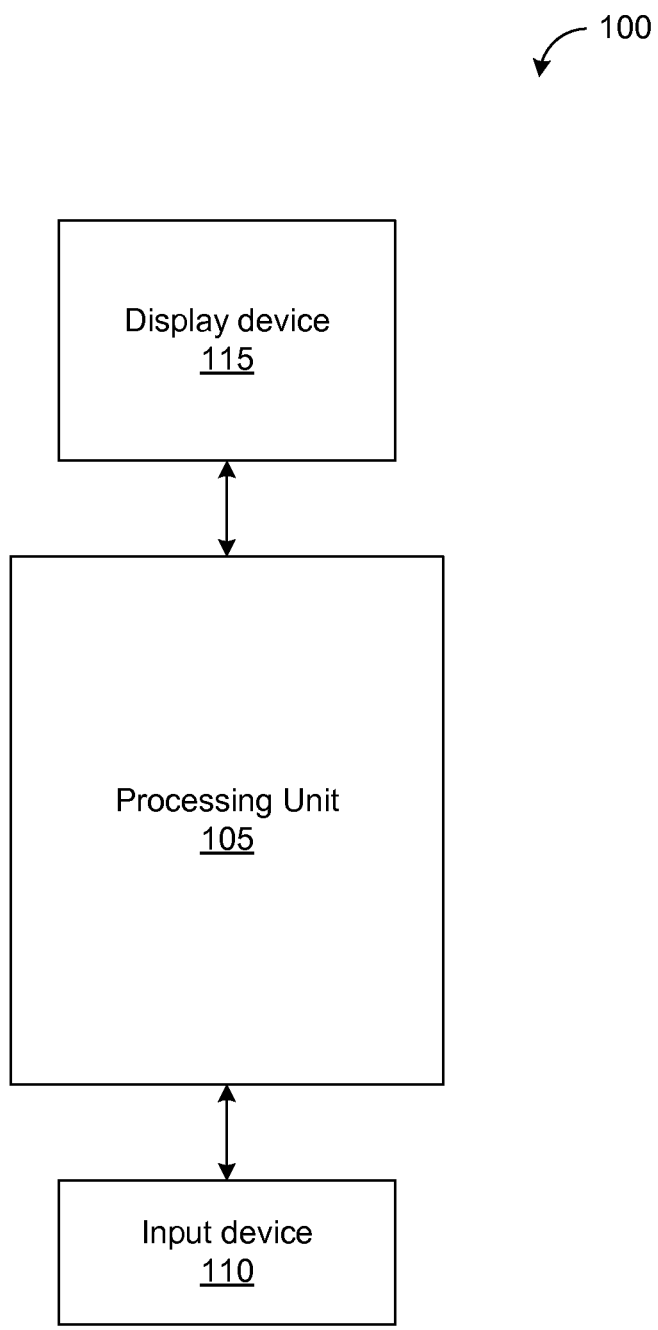
FIG. 1 is an example of a schematic of a stand-alone computer system.

FIG. 1 depicts an example of a stand-alone computer system 100 on which advertisements can be presented to a user of the system 100. The stand-alone computer system 100 can be a personal computer (PC) that is not connected to a network, e.g., the internet, a LAN, a WAN, and the like. Alternatively, the stand-alone computer system 100 can be connected to the network, but need not interact with the network at all times. The stand-alone computer system 100 can include all features and resources required for a user to perform operations without utilizing resources of the network. In addition, the stand-alone computer system 100 can simultaneously and/or independently perform operations involving utilization of features and resources on the network and features and resources available on the system 100. The system 100 can include a processing unit 105, an input device 110, and a display device 115. The system can be virtually any suitable device, e.g., desktop computer, notebook computer, smart phone, Personal Digital Assistant (PDA), other electronic device, entertainment system device, and the like, that can be operated as a stand-alone device. In some implementations, the system 100 need not be connected to a network, e.g., the internet. In other implementations, the system 100 can be connected to the internet but not interact with the internet to perform local operations, e.g., use resources available on the internet to search for content stored on the system 100, use a diagnostics software available on the web to scan the system 100 for viruses, and the like. The system 100 can be connected to the internet via wired or wireless links.

In some implementations, the processing unit 105 can be a central processing unit (CPU) of a desktop computer. The processing unit 105 can be coupled to the input device 110 and the display device 115 via wired or wireless links. The input device 110 can be virtually any input device including mouse, track ball, keyboard, stylus, touch pad, touch screen, and the like. The display device 115 can be virtually any display device including cathode ray tube (CRT) and liquid crystal display (LCD) monitor. In some implementations, the input device 110 can be integrated into the display device 115, e.g., touch screen. The integrated input device 110 and display device 115 can be operatively coupled to the processing unit 105. The processing unit 105 can include a storage device that can contain files.

In some implementations, one or more advertisement files can be stored on a storage device operatively coupled to the system 100. For example, the storage device can be the hard disk of a personal computer (PC). The advertisement file can include one or more advertisements and one or more keywords. Though reference is made to the storage of advertisements in the advertisement file, other forms of content are possible. Further, the advertisement file or contents therein can be configured to be included in search results when a user searches for content on the system 100. A user can search for content on the system 100 using a search facility available on the system 100. In some implementations, the user can search for content in the hard disk of the system 100. The search results retrieved based on the user's search can be one or more files stored on the hard disk of the system 100. The files retrieved upon searching can be presented to the user on the display device 115. The advertisement file can be configured to be included in the search results. In addition, the advertisement file or portion thereof can be configured to be displayed at or near the top of the search results, thereby improving the visibility of the advertisement file. When presented on a display device, the advertisement(s) in the advertisement file can be displayed. In one example, the file name of the advertisement file can be a product name. The product name can be displayed among search results. Alternatively, the file can be encoded such that in response to the file being included among search results, the advertisement in the file is displayed. In this manner, a user searching for content on a stand-alone device can be presented with advertisements.

In some implementations, an advertisement file generator from which the advertisement file is received can request the system for permission to place the advertisement file in the storage device operatively coupled to the system. For example, the advertisement file can be located on a server hosting a web site on the internet that the user is browsing. The server can request the user of the system 100 for permission to place the advertisement file on a storage device operatively coupled to the system 100. In another example, the advertisement file can be located on a compact disc (CD). The CD can include executable instructions that can present a request on the display device 115 of the system 100. In another example, the advertisement file can be attached to an electronic mail (e-mail) that the user has received. When the user opens the e-mail, a request can be presented seeking permission to place the advertisement file on the storage device coupled to the user's system 100. In some implementations, the request for permission can be a window including a "Yes" and "No" button. The user may choose "Yes" to grant the requested permission. The advertisement file can be downloaded to the storage device of the system 100 if the permission is granted. In some implementations, a copy of the advertisement file can be generated and stored on the storage device. In other implementations, the advertisement file can be transferred to the storage device. In other implementations, upon receiving permission from the user, an advertisement file can be generated and placed on the storage device. In such implementations, every instance of the user granting permission can cause the generation of advertisement files that contain different advertisements.

In some implementations, the user's internet service provider (ISP) may offer to place advertisement files on the user's storage device that are relevant to the user's internet browsing history. Alternatively, a server hosting a web site that the user visits may present such an offer to the user. In some implementations, the permission to download files can be sought prior to downloading the advertisement files. For example, permission can be sought when the system 100 is first connected to the internet. Alternatively, permission can be sought when a web browser is opened. In other implementations, the permission can be sought when a user accesses a server providing an advertisement file for the first time. Alternatively, permission can be sought and received as part of a service agreement, such as a service agreement to access or be provided certain services (e.g., by an ISP). If permission is granted, subsequent advertisement files provided by the approved server may not seek permission for each placement of the advertisement file. In such implementations, since permission has already been received from the user, storing the advertisement file on the storage device can be performed in a manner that is invisible to the user. For example, the advertisement file can be stored on the storage device without an intimation on the display device 115 informing the user that file storage is in progress or has occurred. In other implementations, each time an attempt is made to place an advertisement file on a local storage device, the user's permission can be sought.

In some implementations, the permission to retain downloaded files on the storage device of the user's system 100 can be sought after placing the advertisement file on the storage device. For example, an advertisement file can be downloaded to a storage device operatively coupled to a system 100. The advertisement file can be configured to present a window on the display device 115 operatively coupled to the system 100 intimating a user that the advertisement file has been placed on the system. The window can further be configured to enable to user to accept or reject the advertisement file. Upon detecting that the advertisement file has been rejected, the advertisement file can be configured to be removed from the system 100. In this manner, advertisement files can be placed on the system 100 prior to receiving permission from a user.

In some implementations, the permission to download files to the storage device can be sought while the advertisement file is being downloaded. For example, the advertisement file may be a large file that takes time to download. Alternatively, the connection between the system 100 and the internet may be slow and/or of a low bandwidth. In such instances, as the advertisement file is being downloaded to a storage device operatively coupled to the system 100, the advertisement file can be configured to present a window on the display device 115 operatively coupled to the system 100 informing the user that the advertisement file is in the process of being downloaded to the storage device. Permission may be sought to complete download. If the user denies such permission, the download may be aborted and any portion of the advertisement file placed on the storage device can be removed.

In some implementations, once the user grants permission, the advertisement file or files can be downloaded to the user's storage device invisibly without further intimation to the user. For example, the user can be browsing a web page on a web site. The web site may offer an advertisement file. The server hosting the web site may check the user settings on the user's web browser to detect if the user has granted permission to servers to place advertisement files on the user's local storage device. Upon detecting that such permission has been granted, the server hosting the web site can push the advertisement file to the storage device operatively coupled to the system in a background without informing the user of such operation. While the user continues to browse internet, the advertisement file can be placed on the storage device operatively coupled to the system. In this manner, one or more advertisement files can be invisibly downloaded to the storage device operatively coupled to the stand-alone system 100.

In other implementations, the user can request intimation prior to each instance of a file being placed on the storage device. For example, when a server places an advertisement file on the user's storage device, a window may be presented on the user's display device 115 with information related to the advertisement file being downloaded, a Uniform Resource Identifier (URI) where the file will be stored, and the like. In other implementations, the window presented on the user's display device 115 may request the user to confirm the user's permission to save the advertisement file to the storage device. In this manner, a user may allow certain advertisement files while rejecting other advertisement files.

In some implementations, advertisements in the advertisement file can be replaced and/or appended during each instance that the user connects to the internet. In other implementations, a new advertisement file can be placed on the storage device during each instance that the user connects to the internet. In some implementations, the user can receive advertisements regardless of the relevance of the advertised products and services. Once the user permits the advertisement file to be invisibly placed on the local storage device, any type of advertisement may be included in the advertisement file placed on the local storage device. Alternatively, the user can choose advertisements from a list of the products and services to be included in the advertisement file. In other implementations, the user can be provided with a list of advertisements that may be included in the advertisement file. The user can approve or reject one or more advertisements, types of advertisements, or sources of advertisements. In some implementations, an advertisement file including advertisements can be downloaded to a storage device of the user's system 100 with or without the user's knowledge and/or permission.

In some implementations, a user can download the advertisement file from one or more web pages of one or more web sites, while browsing the internet, to the local storage device. The user can download a file that is different from the advertisement file. The advertisement file can be configured to be attached to any downloaded file. In some implementations, the user may not be aware that the advertisement file is attached to the downloaded file. In other implementations, the advertisement file may request permission to be included in the downloaded file. The user may or may not grant such permission. In other implementations, the advertisement file can be configured to be attached to the downloaded file and downloaded regardless of the user's permission.

Several advertisement files can be downloaded where each advertisement file includes a corresponding (or plural) advertisement(s). Alternatively, one advertisement file including several advertisements can be downloaded. In some implementations, one or more advertisement files can be downloaded in a folder containing files. In some implementations, a user can receive an electronic mail (e-mail) including the advertisement file as an attachment. The advertisement file can be configured to be saved on the user's local storage device when the user accesses the e-mail. Alternatively, the advertisement file can be configured to be saved on the user's local storage device when the user accesses the advertisement file. In some implementations, the advertisement file can be included on an installation compact disc (CD) containing instructions and executable code to operate an application, e.g., software program, on the system 100. When a user installs the application on the system 100 using the installation CD, the advertisement file can be included among the files installed on the system 100. In some implementations, a user may be provided with an option to choose if the user wishes to include the advertisement file among the installed files.

In other implementations, the advertisement file may be included with the installed files without the user's knowledge or permission. In some implementations, the advertisement file can be included in an executable file, e.g., a virus, a worm, and the like. The executable file can already be stored on the system. Alternatively, the executable file can be a new file stored on the system. The executable file can be received over a network or from an external storage device which was previously coupled to a different system on which the executable file was stored. The executable file can be configured to replicate itself, wherein each instance of replication can create a different advertisement file. The advertisement file can be received from a user in a file sharing network, e.g., over a peer-to-peer network. The advertisement file can be received as part of an upgrade of an existing software package. When a user downloads an upgrade package or an upgrade patch, the files received in the upgrade can include the advertisement file. The advertisement file can be placed on the local storage device without the user's permission or knowledge. The advertisement file can be placed on the local storage device by a remote system administration package. For example, the system 100 can be continuously monitored by a remote system administrator. As part of the monitoring, the remote system administrator can send files to the system 100 for storage on the local storage device. The user may be unaware of the remote system administration or may have previously granted permission to such administration. The advertisement file can be included in the remote system administration package files. The advertisement file can be located in a hidden part of a web page and can be placed on the local storage device when the user's system accesses the web page. The advertisement file can be included as a hidden part of an e-mail and can be placed on the local storage device when the user accesses the e-mail. The advertisement file can be included as part of a uniform resource locator (URL) or e-mail address.

Figure 2A:
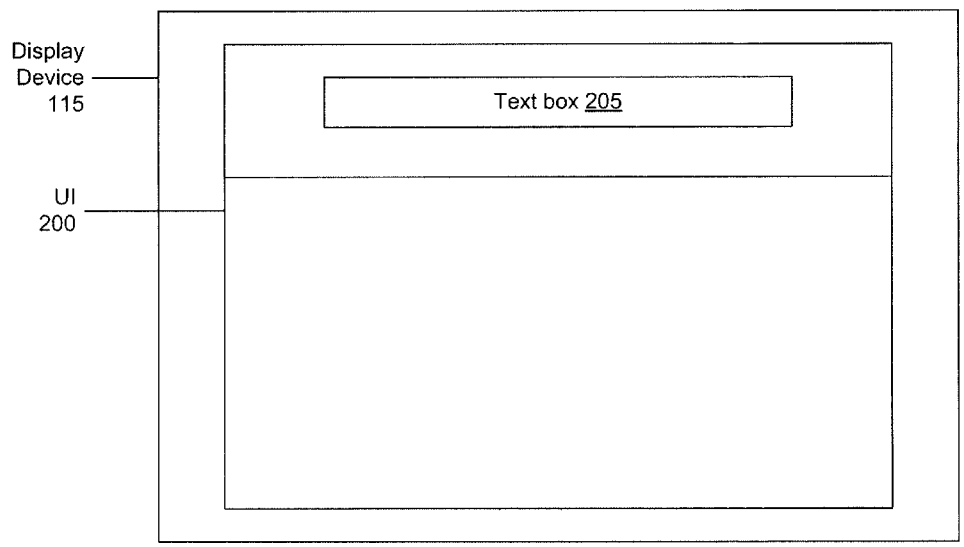
FIGS. 2A and 2B are examples of a user interface for performing a local search.

FIG. 2A depicts an example of a user interface 200 for searching for content on the system 100. The system 100 can include one or more search facilities. For example, a desktop search engine can be installed on the system 100. The search engine can create an index database of the content stored on the system 100. Subsequently, a user can search for content by interacting with a user interface 200 related to the desktop search engine on the display device 115. In some implementations, the user interface 200 can include a text box 205. The user can enter a search query into the text box 205. The search query can be one or more strings. In some implementations, the search query can be a string of text that is identical to text in one or more of the files stored on the system 100. Alternatively, the search query can be multiple strings of text that are identical to text in one or more files stored on the system 100. Each string of text can be separated by a delimiter including a space, a comma, a colon, quotes, and the like. The search query can include Boolean operators including AND, OR, and the like. The Operating System (OS) of the system 100 can recognize the delimiters, Boolean operators, and other entries, in addition to the search query, and process the search query accordingly. In other implementations, the search query can be all or part of a file name. The search query can also include wild card characters such as asterisk (*), ampersand (&), and the like. In other implementations, the user interface 200 can present a user with multiple text boxes 205, wherein each text box can be configured to accept information related to the user's search criteria. The inputs to the text boxes can include one or more of one or more words in a file, a file type, a date of creation, and the like.

Figure 2B:
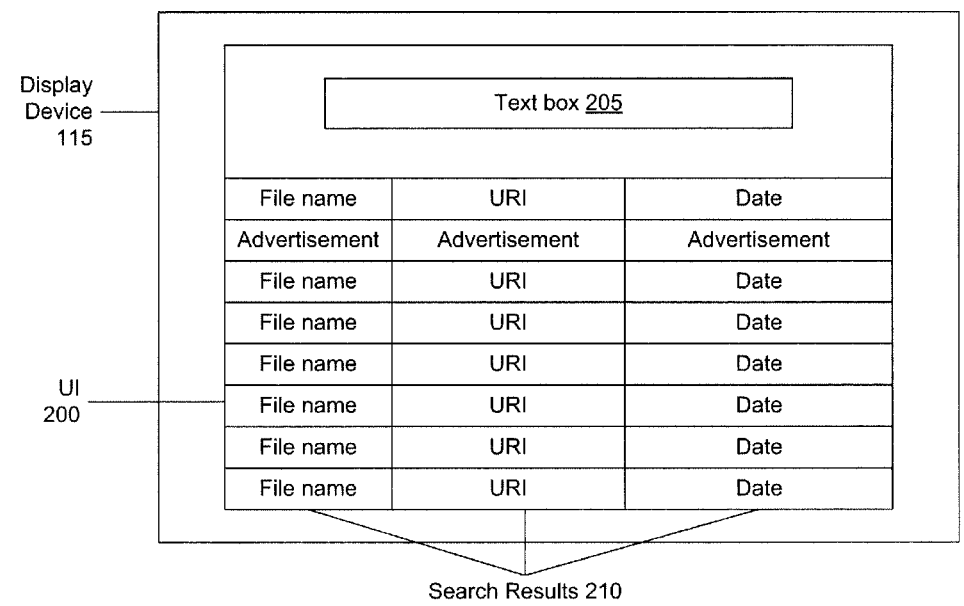

FIG. 2B depicts an example of a user interface 200 displaying search results 210 in response to a user's search query. The search results 210 can include a file name of a file that matches the search query. For example, one or more key words in the search query may be found in the contents of the file. The file name can be displayed on the user interface. In another example, the search query may be all or part of a file name. In some implementations, the search results 210 can be displayed in the form of a list. The list can display metadata related to each file in the search results including file name, a uniform resource identifier (URI), a date, and the like. The file name displayed in the search result may include all or part of the search query in all or part of the file name. In some implementations, the URI can include the directory in which the file is located. For example, the URI can be C:\MyDocuments\Folder\Filename. In addition, the search results 210 can include a date when the file was created. Alternatively, the date can be the date of last modification of the corresponding file. In addition, the search results 210 can show additional information such as file size and the like. In other implementations, each file can be displayed as a corresponding icon. A user can access a displayed file using the input device 110. For example, the user can open a file by clicking on the file using a mouse. Metadata related to the file can be displayed adjacent to the file.

In some implementations, the advertisement file stored on the system 100 can include one or more commonly used key words. In such implementations, one or more advertisement files can be displayed as part of the search results 210 if one or more key words in the search query match one or more key words in a respective advertisement file. When the advertisement file is displayed as part of the search results, each field in the list of metadata of search results can display an advertisement. For example, an advertisement can be displayed in place of the file name, the URI, and the date. Each advertisement can be related to the same product. Alternatively, each advertisement can be related to multiple products. If the advertisement file includes several key words and the search query includes multiple key words, then the advertisement file can be configured such that the advertisement is treated as a separate file for each matching keyword. In such implementations, the advertisement file can be displayed more than once in response to search results. In each instance, the advertisement displayed can be the same or different advertisement. In other implementations, the advertisement file can be configured to be displayed regardless of the words in the search query. In other implementations, the advertisement file can be configured to be filled with words used in previous search queries and subsequently be displayed when the user enters a search query including one or more of the previously used words.

Figure 3:
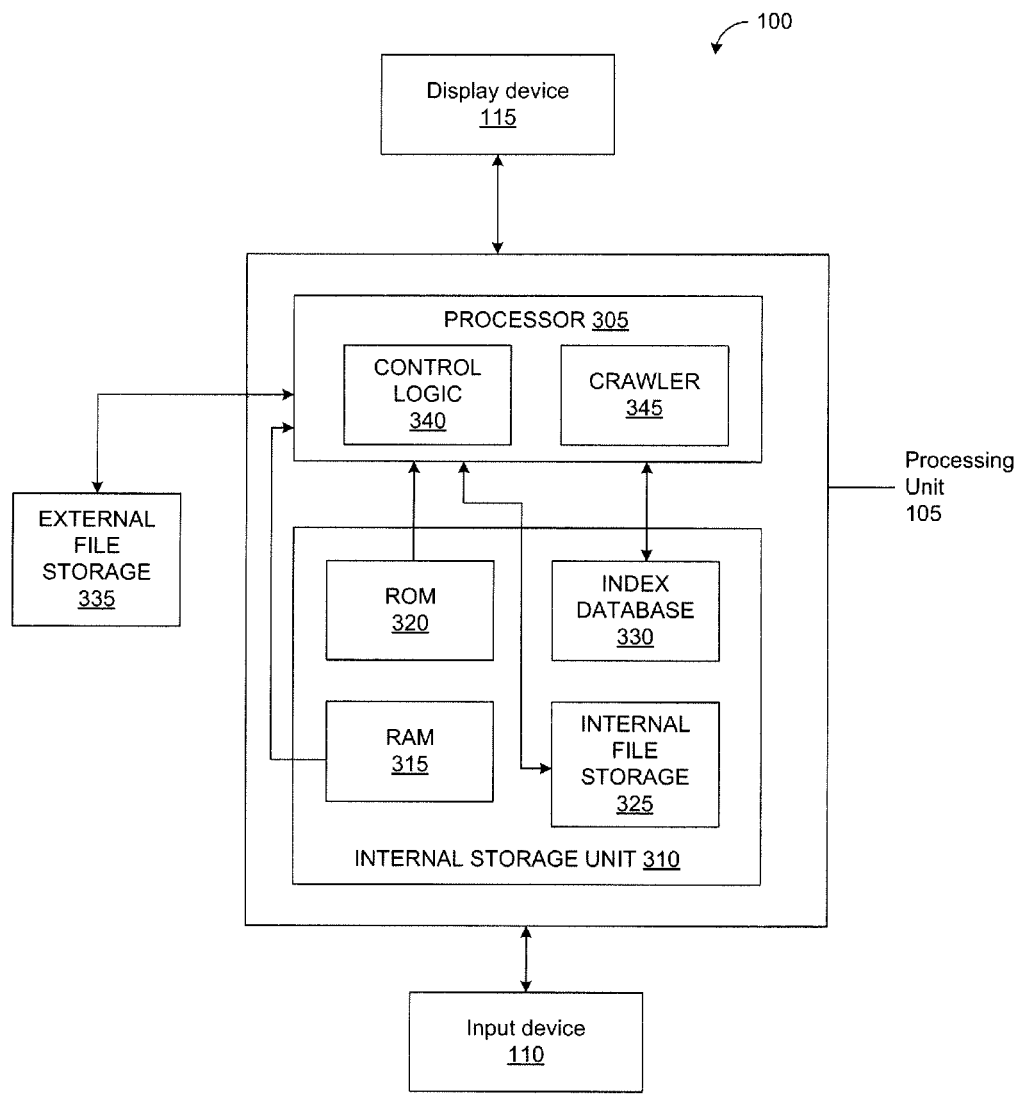
FIG. 3 is an example of a schematic of a stand-alone computer system.

The desktop search engine can create an index database of content stored on the system 100. The advertisement file(s) can be included in or referenced by the index database. FIG. 3 depicts an example of a system 100 including an index database. The processing unit 115 of the system 100 can include a processor 305 and an internal storage unit 310. The internal storage unit 310 can include random access memory (RAM) 315, a read only memory (ROM) 320, an internal file storage 325, and an index database 330. In addition, the processing unit 115 can be operatively coupled to an external file storage 335. For example, the internal file storage 325 can include the hard disk of the system 100 where files can be stored. The external file storage 335 can include one or more portable storage devices. The internal file storage 325 and the external file storage 335 can individually or collectively represent the local storage device of the system 100. The system 100 can operate using the control logic 340 in the processor 305 and the instructions stored in RAM 315 and ROM 320. These operations can include creating, modifying, deleting, and processing content of any type including text, audio, video, images, and the like. The content thus generated can be stored in the internal file storage 325. Alternatively, or in addition, content created on other systems can be transferred to the internal file storage 325. The transferred content can be stored on portable storage devices including universal serial bus (USB) memory devices, compact discs (CDs), digital video discs (DVDs), and the like. Further, content can be received by the system 100 via electronic mail (e-mail). The received content can be downloaded and stored on the internal file storage 325. In some implementations, the system 100 can be connected to the internet. Content downloaded from the internet can be stored in internal file storage 325.

In other implementations, content created using the system 100 can be stored on an external file storage 335. The external file storage 335 can be operatively coupled to the processing unit 105. In some implementations, the external file storage 335 can include a USB memory device connected to the processing unit 105 via a USB cable. A processing unit 105 can be connected to more than one external file storage 335. In some implementations, the index database 330 can be created based on the content of only the internal file storage 325. In other implementations, the index database 330 can be created based on the content of all the storage devices including internal file storage 325 and external file storage 335, at the time the index database 330 is created. In some implementations, the user can choose to include or exclude one or more storage devices for index database 330 creation. In some implementations, the index database 330 can be automatically created when the desktop search engine is installed in the processing unit 115. In some implementations, the user can include or exclude one or more files from the index database 330. The included or excluded files can include one or more of the advertisement files. In other implementations, one or more advertisement files can be configured to be included in the index database 330 unless the user specifically excludes the one or more advertisement files. In other implementations, one or more advertisement files can be configured to be included in the index database 330 even if the user specifically excludes the one or more advertisement files. In other implementations, when a user is presented with a list of files to choose for inclusion or exclusion, the advertisement file can be configured to be hidden from display. The advertisement file can be included in the list of files chosen for inclusion in the index database 330. The desktop search engine can include instructions specific to the OS of the system 100. When the OS executes the instructions encoded in the desktop search engine, a user interface 200 to be displayed to a user to enable searching and the creation of an index database 330 can be among the outputs of the execution.

The processing unit 115 can include a crawler 345 installed in the processor 305. The crawler 345 can be a component of the desktop search engine. The crawler 345 can be installed in the processor 305 when the desktop search engine is installed. The crawler 345 can be configured to browse the contents stored in a storage device. The index database 330 can be a table of contents browsed by the crawler 345. In default implementations, the crawler 345 can browse only the internal file storage 330 in the processing unit 115. In other implementations, crawler 345 can browse all the storage devices, including internal file storage 325 and external file storage 335, connected to the processing unit 115 at the time of creating the index database 330. In other implementations, the storage device that the crawler 345 browses to generate the index database 330 can be altered based on user input. The desktop search engine can be configured such that the crawler 345 can browse the contents of storage devices periodically to update the index database 330. For example, the crawler 345 can be configured to browse the internal file storage 325 and any other external file storage 335 connected to the processing unit once a week. In other implementations, the crawler 345 can be configured to browse the storage device every time a user operation on one or more files is detected. The operation can include creating, deleting, modifying content, and the like. In some implementations, the frequency with which the crawler 345 browses storage devices can be a pre-determined by the desktop search engine. In other implementations, the frequency can be altered by the user. In this manner, the desktop search engine can keep the content of the index database 330 current.

FIG. 4 is an example of an index database 330. In some implementations, the content on storage devices can be tabulated. The table can include columns, each column representing an attribute of the files stored in the storage device. For example, each piece of content can be identified by a key. The piece of content can be a file. The key column 405 can include the key assigned to each file. Similarly, the file name column 410 can include the names under which each file is stored. The directory column 415 can list the URIs of each file. The table can also include a metadata column 420. Additionally, the table can include a content column 425. The content column can include one or more key words in each file. Additional columns can include a frequency at which one or more key words appear in each file. In addition, the index database 330 can include one or more of a word proximity, cost to access a file if the file is an advertisement file, the payout for displaying the advertisement, word stems, related words that may not appear in the file, and the like. In some implementations, the index database 330 can have a clustered architecture. Alternatively, the architecture of the index 330 can be non-clustered. The index database can be distributed both remotely and locally.

One or more files stored in storage devices containing content relevant to the search query can be determined by comparing the search query against the contents of the index database 330. The advertisement file can include one or more frequently searched key words. In some implementations, the key words in the advertisement file can be commonly used words including "a," "the," and the like. The key words in the search query can be chosen based on a high probability that the search query will contain one or more commonly used words. In other implementations, instructions to monitor a user's search query can be encoded such that words in one or more of a user's previous search queries can be retrieved and included in the advertisement file. Subsequently, the advertisements can be presented to the user when the search query includes one or more words that a user has used in previous searches. In other implementations, the advertisement file can be configured to be displayed to the user regardless of the content of the search query.

In some implementations, the advertisement file can be stored under one or more file extensions, e.g., ".doc," ".pdf," ".mp3," and the like. The file extensions can be popular file extensions that may normally be found on a computer. Alternatively, or in addition, the file extensions of all the files on a storage device can be determined, and the advertisement file can be assigned one or more file extensions that are found most frequently on the storage device. In this manner, if a user searches for a file by the file type, e.g., based on the file extension, the advertisement in the advertisement file can be displayed.

In some implementations, the desktop search engine can rank the contents of the storage device based on one or more factors including the frequency at which one or more words appear in each file. The frequency at which one or more words appear in each file can be included in the index database 330. When the search results are displayed, a file of higher rank can be displayed ahead of a file of lower rank among the search results. The advertisement file can include multiple key words, where the multiple key words are the same word repeated several times. Thus, the desktop search engine can assign a high rank to the advertisement file since the frequency at which words in the advertisement file appear is high. Subsequently, when a user searches for the word in the advertisement file, the advertisement file can be displayed ahead in the search results, thereby increasing the probability that a user will view the advertisement. In other implementations, the advertisement file can include several repetitions of the different key words, so that the rank of the advertisement file with respect to each key word can be high. In some implementations, a user can be encouraged to choose an advertisement file displayed in the search results. For example, the advertisement file can be configured to be displayed under a file name of a file that is included in the search results. The user may click on the file name believing that it is the file of interest, but may be presented with the advertisements in the advertisement file. In other implementations, the advertisement file can include instructions to generate one or more URIs that may be the same as or similar to the file name containing content that the user is searching for. Each of the generated URIs may point to the advertisement file. The URIs can be displayed among the search results. When the user chooses one of the URIs, the advertisement in the advertisement file can be displayed. For each instance when the user chooses one of the generated URIs, a different advertisement can be displayed.

In some implementations, the advertisement can be presented to the user as a popup window. A popup window displaying the advertisement can be presented when the user chooses the advertisement file in the search results. Alternatively, the popup window can be displayed regardless of the file the user chooses. In other implementations, the advertisement file can be configured to present advertisements in popup windows on a periodic basis. In such implementations, the user need not perform any specific operation for the popup window containing the advertisement to be displayed. In other implementations, the advertisement can be presented in any application that the user executes on the system 100. The advertisement file can be stored on the local storage device. The advertisement file can be configured to include instructions that cause an advertisement to be displayed when a user opens an application, e.g., MS Word. In such implementations, the default opening screen of the application can be replaced by an advertisement. In other implementations, when a user performs a function in an application, e.g., opens a file, an advertisement can be displayed. In some implementations, a user can create macros within software applications. The advertisement file can contain instructions to include advertisements within the macro, such that advertisements are displayed when the user executes the macro.

Figure 5:
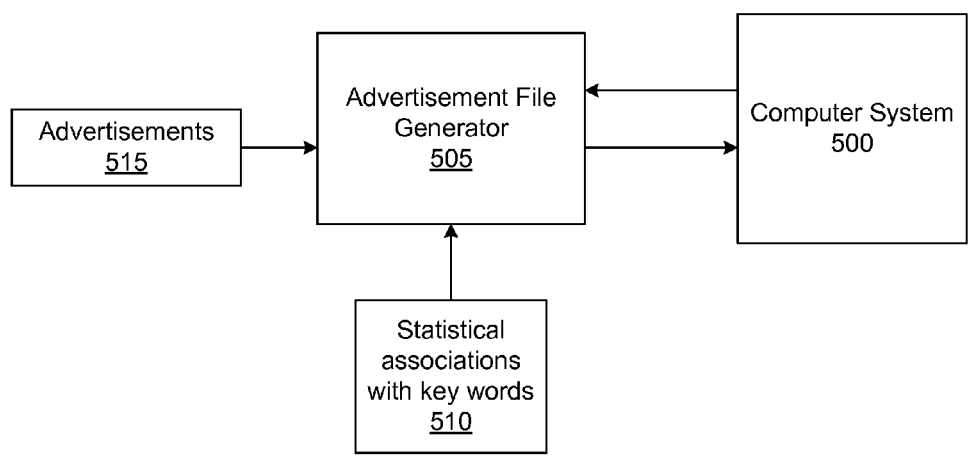
FIG. 5 is a schematic of an advertisement file generator.

FIG. 5 is an example of a schematic of an advertisement file generator 505 for generating an advertisement file. In some implementations, an advertisement file generator 505 can be a computer system connected to the internet. In other implementations, the advertisement file generator 505 can be connected to the internet but not interact with the internet. The advertisement file generator 505 can include a processing unit, an input device, and a display device, where the input device and the display device are operatively coupled to the processing unit. The advertisement file generator 505 can be connected to a network, e.g., LAN, WAN, and the like. Alternatively, the advertisement file generator 505 can be a stand alone computer system.

The advertisement file generator 505 can be used to create one or more advertisement files. The advertisement file can include one or more advertisements and text including key words. The advertisement file generator 505 can be configured to encode instructions into the advertisement file to cause the one or more advertisements to appear at or in proximity to a predefined location (e.g., at or near a top) of a search results list when a search of the storage device is performed. An operator of the advertisement file generator 505 can be the creator of the advertisement file.

In some implementations, the key words in the advertisement file can be input to the advertisement file using the input device operatively coupled to the advertisement file generator 505. In other implementations, the advertisement file generator 505 can track one or more words input to the computer system 500 and include one or more of the tracked words in the advertisement file. In other implementations, the advertisement file generator 505 can associate stored key words to the key words included in the advertisement file. The associated key words can be located in a device that stores the statistical associations with key words 510. The advertisement file generator 505 can further include advertisements 515 in the advertisement file. The advertisements 515 can be sent to the advertisement file generator 505 by an advertiser. Alternatively, a user of the advertisement file generator 505 can save advertisements found on a network, e.g., on the internet on a storage device and include the saved advertisements in the advertisement file. In other implementations, a user of the advertisement file generator 505 can create new advertisements and include the new advertisements in the advertisement file.

The advertisement file generated using the advertisement file generator 505 can be placed on the computer system 500. In some implementations, the advertisement file generator 505 can be operatively coupled to a computer system 500. The storage device on which the advertisement file generator 505 stores the advertisement file can be operatively coupled to the computer system 500. The advertisement file generator 505 can store the advertisement file on the storage device through such a connection. In other implementations, the advertisement file generator 505 can generate the advertisement file and store the generated file on a storage device. Alternatively, the advertisement file generator 505 can transmit the advertisement file to a remote location over the network. For example, the advertisement file generator 505 and the computer system 500 can be connected to the internet. The advertisement file, created using the advertisement file generator 505, can be uploaded on the internet. In some implementations, the advertisement file can be stored on a server and a uniform resource locator (URL) pointing to the advertisement file can be presented on one or more web pages. A user operating the computer system 500 can download the advertisement file by accessing the URL. Alternatively, the advertisement file can be attached with one or more files uploaded on the internet. When a user of the computer system 500 saves the one or more files on a storage device coupled with the computer system 500, the advertisement file can also be stored on the storage device.

Figure 6:
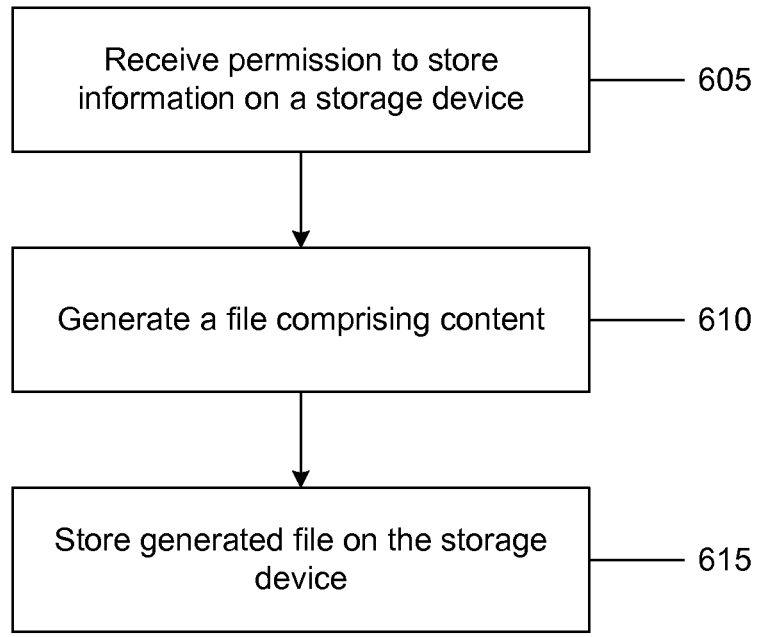
FIG. 6 is a flow chart of an example of a process of storing an advertisement file on a storage device.

FIG. 6 is a flow chart depicting an example of a process for presenting advertisements to a user in response to a local search for content. In some implementations, permission can be received from a user to store information on a storage device operatively coupled to a computer system associated with the user at 605. A file can be generated such that the file includes content designed to cause at least a portion of the file to be displayed in search results when a search of the storage device is performed at 610. The generated file can be stored on the storage device in a manner that is invisible to the user of the computer system. The content can include one or more advertisements at 615. The content can include one or more advertisements and text including key words selected by a creator of the file. The file can be configured such that the one or more advertisements can appear at or near the top of a search results list when the contents of the storage device is searched. The file can be placed in a hidden folder on the storage device. Placing the file in a hidden folder can be the invisible manner of storing the generated file. The invisible manner can include delaying placing the file on the storage device for a substantial period of time after permission is received from a user. Generating and storing the file can occur on an ongoing basis over time. Generating and storing the file can occur on a periodic basis over time. Generating and storing the file can be repeated one or more times. Generating the file and receiving permission can be order independent. The permission can be received in response to a request. The permission can be sought from the user. The storing can be pursuant to receiving the permission. The storing can be prior to receiving the permission. The file can be removed if the permission is denied. The storing can be during receiving the permission. The storing can be aborted if permission is denied. The stored file can be in an index database of content of the storage device. The generated file can be received as an attachment to an electronic mail. The generated file can be included among installation files for an application to be installed on the computer.

Figure 7:
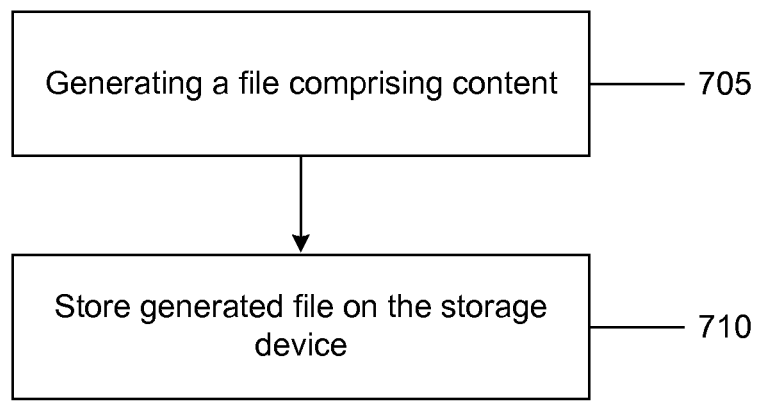
FIG. 7 is a flow chart of an example of a process of storing an advertisement file on a storage device.

FIG. 7 is an example of a process of placing an advertisement file on a storage device coupled to a computer without the knowledge or permission of a user. A file can be generated at 705, wherein the file includes content designed to cause at least a portion of the file to be displayed in search results when a search of a storage device including the generated file is performed. The generated file can be stored on a storage device at 710. The storage device can be operatively coupled to a computer system associated with a user in a manner where the storing is invisible to a user of the computer system. In some implementations, the generated file can be stored without receiving permission from a user of the computer system. In other implementations, the generated file can be stored despite the user's refusal to grant a permission to store the generated file. The generated file can be the advertisement file. The advertisement file can include one or more advertisements. The advertisement file can be configured such that the one or more advertisements can appear at or near the top of search results list when the contents of the storage device is searched. The advertisement file can be placed in a hidden folder on the storage device. Placing the advertisement file in a hidden folder can be the invisible manner of storing the advertisement file. The generating and storing can occur on an ongoing basis over time. Generating and storing the advertisement file can occur on a periodic basis over time. Generating and storing the advertisement file can be repeated one or more times. The advertisement file can be an attachment to an e-mail. Alternatively, the advertisement file can be among the installation files that are installed on a computer to operate an application, e.g., a software program. In some implementations, the advertisement file can be downloaded onto the storage device of the computer when a user browses the internet.

In some implementations, a user can present a search query using an input device. The search query can include one or more strings of text. The search query can be compared against the index database to identify one or more files in the storage device containing content that matches the search query. The advertisement file can be configured such that when a search is performed, the advertisement file can included in the search results such that the advertisement in the advertisement file is displayed at or near the top of the search results. In some implementations, the advertisement file can include key words that can match the strings in the search query. In this manner, the advertisement file can be presented as one of the files on the storage device containing content relevant to the search query. In other implementations, the advertisement file can be configured to be included in the search result regardless of the search query. As long as a search is performed, the advertisement in the advertisement file can be displayed.

A number of embodiments have been described. Nevertheless, it will be understood that various modifications may be made without departing from the spirit and scope of the disclosure. For example, the system 100 can be a LAN where a server is connected to several nodes. The server can be connected to the internet. The nodes of the LAN can have restricted access to the internet based on the provisions assigned to each node by the server administrator. The administrator can download and save the advertisement file on the storage device of the server. When users at nodes search for content on the server, advertisements in the advertisement file can be presented to the users.

In some implementations, the system can be an intranet or virtually any network. Each node on the intranet can be a computer with a storage device. An advertisement file can be stored on the storage devices of one or all nodes. The users at each node can permit all or portions of the stored content to be accessible to other users in the intranet. When a user searches for content on the commonly accessible storage space of the intranet, an advertisement file stored in one user's storage device can be displayed on the user interface of the user searching for content. In some implementations, the advertisement file can be configured to be displayed along with the search results of any user on the intranet, regardless of whether the content being searched is commonly accessible or private to a computer on the intranet.

In some implementations, the advertisements can be displayed at the nodes of the LAN or the intranet. The nodes of the LAN or the intranet can interact using an application, e.g., a messenger window. A user can enter a message in a messenger window at the user's node. The message can be displayed in the messenger window of one or more other nodes. In implementations where the advertisement file is stored on the server of a LAN, the advertisement file can include instructions to present advertisements in every active messenger window at each node. Alternatively, advertisements can be presented during each instance of a user typing a message in a messenger window, a message being displayed in a messenger window, or both.

In some implementations, the search engine can be a Search Companion on a PC operating under Windows™ OS, Spotlight™ on a Mac™ operating under Mac™ OS, or a search engine on a UNIX™ server. The search engine may not include an index database. Alternatively, the search engine may sequentially compare the search query against all the files in all the folders in the storage device and display relevant files on a user interface as and when the search engine identifies such files. In such implementations, the advertisement file can be displayed on the user interface when the search engine searches the folder in which the advertisement file is stored. In some implementations, the advertisement file can be replicated and stored in multiple folders. The search engine can display each advertisement file, as the same or as a different advertisement, when the search engine searches the folder in which each advertisement file is stored.

In some implementations, the advertisement file can be configured to alter the desktop wall paper on a user's computer. In addition to displaying the advertisement file to the user in response to a search query, the advertisement file can additionally be configured to install an image related to the advertisement as the desktop wall paper on the user's computer. In other implementations, the advertisement file can replace a prior desktop wall paper image. In implementations involving LANs and intranets, the image can be displayed on each node of the network. In other implementations, the advertisement file can be configured to install or alter the display on the screen presented to a user when the user's computer is turned on and turned off. The advertisement file can be configured to alter the display for each instance of the computer being turned on and/or off. In other implementations, the advertisement file can be configured to be presented as an audio file or a video file in place of or in addition to being displayed along with search results. The audio file or video file can be presented in audio/video playing applications installed on the user's system. Alternatively, or in addition, an animation related to the advertisement can be presented on the user's display device. In some implementations, a snippet containing a brief description of the product or service being advertised can be displayed adjacent to the advertisement file in the search results. The audio file, the video file, the animation, the snippets, or any other manifestation of the advertisement can be included in the advertisement file. The advertisement file can be encoded with instructions to display such manifestations when a user performs a search.

In some implementations, when an advertisement file is presented in response to a user's search, the advertisement file can additionally be configured to redirect a web browser on a user's computer such that when a user subsequently connects to the internet by opening the web browser, the user is automatically directed to a web page related to the advertisement in the advertisement file. In some implementations, a user may be offered one or more incentives if the user grants permission to place the advertisement file on the storage device. For example, in return for the permission, the user can be offered an electronic coupon (e-coupon) redeemable when the user visits the advertiser's location, e.g., the advertiser's home page. Accordingly, other implementations are within the scope of the following claims.

What is claimed is:

1. A computer-implemented method comprising:
receiving, by one or more computers, permission from a user computer system to store information including files on a storage device operatively coupled to the user computer system, wherein the permission is received when the user computer system and the one or more computers are connected to a packet-switched network;
generating, by the one or more computers, an executable file including one or more advertisements and instructions, the executable file being configured such that, when the user computer system searches the storage device using a search facility separate from the executable file and generates search results responsive to input, the instructions cause at least one of the advertisements included in the executable file to appear in the search results; and
storing, by the one or more computers, the executable file on the storage device in a manner that is invisible to the user computer system, wherein the executable file is transmitted to the user computer system through the packet-switched network.

2. The method of claim 1 wherein the one or more advertisements comprise text including key words, and wherein the executable file, when executed, is configured to present the one or more advertisements at or near a top of the search results.

3. The method of claim 1 wherein the invisible manner comprises placing the executable file in a hidden folder on the storage device.

4. The method of claim 3 wherein the invisible manner further comprises delaying storing the executable file on the storage device for a substantial period of time following receipt of the user's permission.

5. The method of claim 4 wherein the generating and storing occurs on an ongoing basis over time.

6. The method of claim 4 wherein the generating and storing occurs on a periodic basis over time.

7. The method of claim 4 wherein the generating and storing are repeated one or more times.

8. The method of claim 4 wherein generating the executable file and receiving permission are order independent.

9. The method of claim 1 wherein the permission is received in response to a request.

10. The method of claim 1 further comprising seeking the permission from the user computer system.

11. The method of claim 1 wherein the storing occurs after receiving the permission.

12. The method of claim 1 wherein the storing occurs prior to receiving the permission.

13. The method of claim 12 wherein the executable file is removed if the permission is denied.

14. The method of claim 1 wherein the storing occurs during receiving the permission.

15. The method of claim 14 wherein the storing is aborted if permission is denied.

16. The method of claim 1 further comprising including the stored executable file in an index database of content of the storage device.

17. The method of claim 1 wherein the executable file is received as an attachment to an electronic mail.

18. The method of claim 1 wherein and the executable file is included among installation files for an application to be installed on the user computer system.

19. A non-transitory computer readable medium storing software program instructions executable by one or more computers to perform operations comprising:
  receiving permission from a user computer system to store information including files on a storage device operatively coupled to the user computer system, wherein the permission is received when the user computer system and the one or more computers are connected to a packet-switched network;
  generating an executable file including one or more advertisements and instructions, the executable file being configured such that, when the user computer system searches the storage device using a search facility separate from the executable file and generates search results responsive to input, the instructions cause at least one of the advertisements included in the executable file to appear in the search results; and
  storing the executable file on the storage device in a manner that is invisible to the user computer system, wherein the executable file is transmitted to the user computer system through the packet-switched network.

20. The medium of claim 19 wherein the one or more advertisements comprise text including key words, and wherein the executable file, when executed, is configured to present the one or more advertisements at or near a top of the search results.

21. The medium of claim 19 wherein the operations further include including in the generated executable file, instructions to enable placing the executable file in a hidden folder on the storage device.

22. The medium of claim 21 wherein the operations further include delaying storing the executable file on the storage device for a substantial period of time following receiving permission.

23. The medium of claim 22 wherein the operations further include generating and storing the executable file on an ongoing basis over time.

24. The medium of claim 22 wherein the operations further include generating and storing the executable file on a periodic basis over time.

25. The medium of claim 22 wherein the operations further include generating and storing the executable file repeatedly one or more times.

26. The medium of claim 22 wherein the operations further include generating the executable file and receiving permission to store information on the storage device independent of an order.

27. The medium of claim 19 wherein the operations further include receiving the permission in response to a request.

28. The medium of claim 19 wherein the operations further include seeking permission from the user.

29. The medium of claim 19 wherein the operations further include storing the executable file after receiving the permission.

30. The medium of claim 19, wherein the operations further include storing the executable file prior to receiving the permission.

31. The medium of claim 30 wherein the operations further include removing the executable file if the permission is denied.

32. The medium of claim 19 wherein the operations further include storing the executable file during receiving the permission.

33. The medium of claim 32 wherein the operations further include aborting the storing if permission is denied.

34. The medium of claim 19 wherein the operations further include encoding the executable file with instructions to enable including the executable file in an index database of content of the storage device.

35. The medium of claim 19 wherein the operations further include attaching the executable file to an electronic mail.

36. The medium of claim 19 wherein the operations further include attaching the executable file among installation files for an application to be installed on the computer.

37. A system comprising:
  one or more computers; and
  a medium storing a software program executable by the one or more computers to perform operations comprising:
    receiving permission from a user computer system to store information including files on a storage device operatively coupled to the user computer system, wherein the permission is received when the user computer system and the one or more computers are connected to a packet-switched network;
    generating an executable file, executable by the user computer system, for storing on the storage device, the executable file including one or more advertisements and instructions and being configured such that, when the user computer system searches the storage device using a search facility separate from the executable file and generates search results responsive to input, the instructions cause at least one of the advertisements included in the executable file to appear in the search results; and storing the executable file on the storage device in a manner that is invisible to the user computer system, wherein the executable file is transmitted to the user computer system through the packet-switched network.

38. The system of claim 37 wherein the one or more advertisements comprise text including key words, and wherein the executable file, when executed, is configured to present the one or more advertisements at or near a top of the search results.

39. The system of claim 37 wherein the invisible manner comprises placing the executable file in a hidden folder on the storage device.

40. The system of claim 39 wherein storing the executable file on the storage device in the invisible manner further comprises delaying placing the executable file on the storage device for a substantial period of time following receipt of the user's permission.

41. The system of claim 40 wherein the generating and storing occurs on an ongoing basis over time.

42. The system of claim 40 wherein the generating and storing occurs on a periodic basis over time.

43. The system of claim 40 wherein the generating and storing are repeated one or more times.

44. The system of claim 40, wherein generating the executable file and receiving permission are order independent.

45. The system of claim 37 wherein the permission is received in response to a request.

46. The system of claim 37 wherein the permission is sought from the user.

47. The system of claim 37 wherein the storing occurs pursuant to receiving the permission.

48. The system of claim 37 wherein the storing occurs prior to receiving the permission.

49. The system of claim 48 wherein the executable file is removed if the permission is denied.

50. The system of claim 37 wherein the storing occurs during receiving the permission.

51. The system of claim 50 wherein the storing is aborted if permission is denied.

52. The system of claim 37, the operations further comprising configuring the executable file to be included in an index database of content of the storage device.

53. The system of claim 37 wherein the executable file is received as an attachment to an electronic mail.

54. The system of claim 37 wherein the executable file a is included among installation files for an application to be installed on the computer.

55. A computer-implemented method comprising:
generating, by one or more computers, an executable file comprising one or more advertisements and instructions, for storing on a storage device operatively coupled to a computer system associated with a user, the executable file being configured such that, when a search of the storage device is performed using a search facility separate from the executable file and search results are generated responsive to the search of the storage device, the instructions cause at least one of the advertisements in the executable file to appear in the search results; and storing, by the one or more computers, the executable file on the storage device in a manner that is invisible to a user of the computer system.

56. The method of claim 55 wherein the executable file is stored without receiving permission from a user of the computer system.

57. The method of claim 55 wherein the executable file is stored despite the user's refusal to grant a permission to store the executable file.

58. The method of claim 55 wherein the one or more advertisements comprise text including key words, and wherein the executable file, when executed, is configured to present the one or more advertisements at or near a top of the search results.

59. The method of claim 55 wherein the invisible manner comprises placing the executable file in a hidden folder on the storage device.

60. The method of claim 55 wherein the generating and storing occurs on an ongoing basis over time.

61. The method of claim 55 wherein the generating and storing occurs on a periodic basis over time.

62. The method of claim 55 wherein the generating and storing are repeated one or more times.

63. The method of claim 55 further comprising including the stored executable file in an index database of content of the storage device.

64. The method of claim 55 wherein the executable file is received as an attachment to an electronic mail.

65. The method of claim 55 wherein the executable file is included among installation files for an application to be installed on the computer.

66. A non-transitory computer readable medium storing software program instructions executable by one or more computers to perform operations comprising:
generating an executable file comprising one or more advertisements and instructions, for storing on a storage device operatively coupled to a computer system associated with a user, the executable file being configured such that, when a search of the storage device is performed using a search facility separate from the executable file and search results are generated responsive to the search of the storage device, the instructions cause at least one of the advertisements included in the executable file to appear in the search results; and storing the executable file on the storage device in a manner that is invisible to a user of the computer system.

67. The medium of claim 66 wherein the operations further comprise storing the executable file without receiving permission from a user of the computer system.

68. The medium of claim 66 wherein the operations further comprise storing the executable file despite the user's refusal to grant permission to store the executable file.

69. The medium of claim 66 wherein the one or more advertisements comprise text including key words, and wherein the executable file, when executed, is configured to present the one or more advertisements at or near a top of search.

70. The medium of claim 66 wherein the operations further comprise delaying placing the executable file on the storage device for a substantial period of time following receipt of the user's permission.

71. The medium of claim 66 wherein the operations further comprise generating and storing the executable file on an ongoing basis over time.

72. The medium of claim 66 wherein the operations further comprise generating and storing the executable file on a periodic basis over time.

73. The medium of claim 66 wherein the operations further comprise generating and storing the executable file repeatedly one or more times.

74. The medium of claim 66 wherein the operations further comprise encoding the executable file with instructions to enable including the executable file in an index database of content of the storage device.

75. The medium of claim 66 wherein the operations further comprise attaching the executable file to an electronic mail.

76. The medium of claim 66 wherein the operations further comprise attaching the executable file among installation files for an application to be installed on the computer.

77. A system comprising:
one or more computers; and
a medium storing software program instructions executable by the one or more computers to perform operations comprising:
generating an executable file comprising one or more advertisements and instructions, for storing on a storage device operatively coupled to a computer system associated with a user,
the executable file being configured such that, when a search of the storage device is performed using a search facility separate from the executable file and search results are generated responsive to the search of the storage device, the instructions cause at least one of the advertisements included in the executable file to appear in the search results; and
storing the executable file on the storage device in a manner that is invisible to a user of the computer system.

78. The system of claim 77 wherein storing comprises storing the executable file without receiving permission from a user of the computer system.

79. The system of claim 77 wherein storing comprises storing the executable file despite the user's refusal to grant a permission to store the executable file.

80. The system of claim 77 wherein the one or more advertisements comprise text including key words, and wherein the executable file, when executed, is configured to present the one or more advertisements at or near a top of the search results.

81. The system of claim 77 wherein storing the executable file in an invisible manner comprises placing the executable file in a hidden folder on the storage device.

82. The system of claim 77 wherein the generating and storing occurs on an ongoing basis over time.

83. The system of claim 77 wherein the generating and storing occurs on a periodic basis over time.

84. The system of claim 77 wherein the generating and storing are repeated one or more times.

85. The system of claim 77, the operations further comprising including the executable file in an index database of content of the storage device.

86. The system of claim 77 wherein the executable file is received as an attachment to an electronic mail.

87. The system of claim 77 wherein the executable file is included among installation files for an application to be installed on the computer.

88. A computer-implemented method comprising:
generating, by one or more computers, an executable file including one or more advertisements and instructions for storing on a storage device operatively coupled to a computer system associated with a user,
the executable file being configured such that, when a search of the storage device is performed using a search facility separate from the executable file and search results are generated responsive to the search of the storage device, the instructions cause at least one advertisement to be displayed in the search results; and
transmitting, by the one or more computers, the executable file to a user's computer for storage on the storage device.

89. A non-transitory computer readable medium encoding software program instructions executable by one or more computers to perform operations comprising:
generating an executable file including one or more advertisements and instructions for storing on a storage device operatively coupled to a computer system associated with a user,
the executable file being configured such that, when a search of the storage device is performed using a search facility separate from the executable file and search results are generated responsive to the search of the storage device, the instructions cause at least one advertisement to be displayed in the search results; and
transmitting the executable file to a user's computer for storage on a storage device operatively coupled to a computer system associated with the user.

90. A system comprising:
one or more computers; and
a medium encoding software program instructions executable by the one or more computers to perform operations comprising:
generating an executable file including one or more advertisements and instructions for storing on a storage device operatively coupled to a computer system associated with a user,
the executable file being configured such that, when a search of the storage device is performed using a search facility separate from the executable file and search results are generated responsive to the search of the storage device, the instructions cause at least one advertisement to be displayed in the search results; and
transmitting the executable file to a user's computer for storage on a storage device operatively coupled to a computer system associated with the user.

* * * * *

UNITED STATES PATENT AND TRADEMARK OFFICE
CERTIFICATE OF CORRECTION

PATENT NO. : 8,473,492 B1
APPLICATION NO. : 11/750170
DATED : June 25, 2013
INVENTOR(S) : Ross Biro Page 1 of 1

It is certified that error appears in the above-identified patent and that said Letters Patent is hereby corrected as shown below:

In the Claims

Claim 54, column 21, line 50, after "file", delete "a".

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,473,492 B1 | Page 1 of 1 |
| APPLICATION NO. | : 11/750170 | |
| DATED | : June 25, 2013 | |
| INVENTOR(S) | : Biro | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,093 days.

Signed and Sealed this
Thirtieth Day of December, 2014

Michelle K. Lee
*Deputy Director of the United States Patent and Trademark Office*